United States Patent [19]

East

[11] Patent Number: 4,473,681

[45] Date of Patent: Sep. 25, 1984

[54] POLYESTER UREA CAPABLE OF FORMING AN ANISOTROPIC MELT PHASE

[75] Inventor: Anthony J. East, Madison, N.J.

[73] Assignee: Celanese Corporation, New York, N.Y.

[21] Appl. No.: 477,094

[22] Filed: Mar. 21, 1983

[51] Int. Cl.$^3$ .................... C08G 63/60; C08G 63/68
[52] U.S. Cl. .................................. 524/601; 528/172; 528/173; 528/190; 528/191; 528/271
[58] Field of Search ............... 524/601; 528/190, 191, 528/271, 272, 172, 173, 183, 184, 185

[56] References Cited

U.S. PATENT DOCUMENTS

| | | | |
|---|---|---|---|
| 4,219,461 | 9/1980 | Calundann | 528/173 |
| 4,256,624 | 12/1980 | Langley et al. | 528/173 |
| 4,330,457 | 5/1982 | East et al. | 528/190 |

*Primary Examiner*—Lester L. Lee

*Attorney, Agent, or Firm*—Burns, Doane, Swecker & Mathis

[57] ABSTRACT

A novel melt processable polyester urea is provided which is capable of forming an anisotropic melt phase. Such polyester urea includes three essential moieties comprising (1) 6-oxy-2-naphthoyl moiety, (2) dicarboxyaryl urea moiety as defined herein, and (3) dioxyaryl moiety. Additional ester- and/or amide-forming moieties may be present in the polyester urea polymer chain so long as they do not destroy the anisotropic character of the polymer melt phase or unduly raise its melting temperature. The polyester urea is suitable for use in high performance applications, and may be used to form via melt processing industrial yarns, reinforcing fibers, films, and molded articles. The presence of the highly polar urea linkages in the polymer chain is believed to beneficially provide strong electron interactions between adjoining polymer chains and between the polyester urea and other materials, such as rubber matrices, dyes, etc.

26 Claims, No Drawings

POLYESTER UREA CAPABLE OF FORMING AN ANISOTROPIC MELT PHASE

BACKGROUND OF THE INVENTION

Wholly aromatic polyester resins have long been known. For instance, 4-hydroxybenzoic acid homopolymer and copolymers have been provided in the past and are commercially available. Such polymers commonly are crystalline in nature, relatively high melting or possess a decomposition temperature which is below the melting point, and when molten frequently exhibit an isotropic melt phase. Molding techniques such as compression molding or sintering may be utilized with such materials. Representative publications which discuss these wholly aromatic polyesters include: (a) *Polyesters of Hydroxybenzoic Acids,* by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols),* by G. Bier, Polymer, Vol. 15, Pages 527 to 535 (August 1974), (c) *Aromatic Polyester Plastics,* by S. G. Cottis, Modern Plastics, Pages 62 and 63 (July 1975), and (d) *Poly(p-Oxybenzoyl Systems): Homopolymer for Coatings: Copolymers for Compression and Injection Molding,* by Roger S. Storm and Steve G. Cottis, Coatings Plast. Preprint, Vol. 34, No. 1, Pages 194 to 197 (April 1974). See also, U.S. Pat. Nos. 3,039,994; 3,169,121; 3,321,437; 3,553,167; 3,637,595; 3,651,014; 3,662,052; 3,668,300; 3,723,388; 3,759,870; 3,767,621; 3,773,858; 3,787,370; 3,790,528; 3,829,406; 3,857,814; 3,884,876; 3,890,256; 3,974,250; and 3,975,487; and U.K. patent application No. 2,058,102A.

It has been disclosed that certain polyesters may be formed which exhibit melt anisotropy. See, for instance, (a) *Polyester X7G-A Self Reinforced Thermoplastic,* by W. J. Jackson, Jr., H. F. Kuhfuss, and T. F. Gray, Jr., 30th Anniversary Technical Conference, 1975 Reinforced Plastics Composites Institute, The Society of the Plastics Industry, Inc., Section 17-D, Pages 1-4, (b) Belgian Pat. Nos. 828,935 and 828,936, (c) Dutch Pat. No. 7505551, (d) West German Nos. 2520819; 2520820; 2722120; 2834535; 2834536 and 2834537, (e) Japanese Nos. 43-223; 2132-116; 3017-692; and 3021-293, (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,272,625; 4,279,803; 4,285,852; 4,287,332; 4,294,955; 4,299,756; 4,314,073; 4,314,688; 4,318,841; 4,318,842; 4,332,759, 4,333,907; 4,335,232; 4,337,190; 4,337,191; 4,339,375; 4,359,569; 4,360,658; 4,362,777; and 3,437,349; (g) U.K. Application No. 2,002,404; and (h) European patent application Nos. 24,499 and 45,499.

Representative disclosures of anisotropic melt forming polyesters, poly(ester-amides) or poly(ester-carbonates) which may include 6-oxy-2-naphthoyl moiety are present in U.S. Pat. Nos. 4,161,470; 4,219,461; 4,256,624; 4,279,803; 4,299,756; 4,318,841; 4,318,842; 4,330,457; 4,337,190; 4,351,917; 4,351,918; 4,355,133; 4,359,569; 4,362,777; and 4,370,466; and commonly assigned U.S. Ser. Nos. 319,024, filed Nov. 6, 1981 (now U.S. Pat. No. 4,371,660), and 401,932 filed July 26, 1982.

In U.S. Pat. No. 4,256,624 a wholly aromatic polyester is disclosed which contains recurring 6-oxy-2-naphthoyl moieties in addition to moieties derived from at least one aromatic diol and at least one aromatic diacid. There is no discussion of providing urea linkages in the resulting wholly aromatic polyester.

See also U.S. Pat. No. 4,219,461 where a wholly aromatic polyester is disclosed which contains recurring 6-oxy-2-naphthoyl moieties, 4-oxybenzoyl moieties, symmetrical dioxyaryl moieties, and symmetrical dicarboxyaryl moieties. Once again there is no discussion of providing urea linkages in the resulting wholly aromatic polyester.

It is an object of the present invention to provide a novel melt processable wholly aromatic polyester urea which possesses more highly polar linkages in the polymer chain than those identified in U.S. Pat. Nos. 4,219,461 and 4,256,624.

It is an object of the present invention to provide an improved wholly aromatic polyester urea wherein the urea linkages contribute a relatively high level of polarity to the polymer chain which beneficially contributes strong electron interactions between adjoining polymer chains and between the polyester urea and other materials, such as rubber matrices, dyes, etc.

It is an object of the present invention to provide an improved melt processable wholly aromatic polyester capable of forming an anisotropic melt phase at a temperature below approximately 400° C., and preferably below approximately 370° C. (e.g. below approximately 350° C.).

It is an object of the present invention to provide an improved wholly aromatic polyester urea which is suited for the formation of quality molded articles, melt extruded fibers, melt extruded films, or for use as a melt adhesive.

It is an object of the present invention to provide improved wholly aromatic polyester urea fibers which particularly are suited for use as fibrous reinforcement in a rubber matrix.

It is an object of the present invention to provide an improved wholly aromatic polyester which readily may be melt extruded to form a film.

It is another object of the present invention to provide an improved wholly aromatic polyester urea which readily may be injection molded to form a molded article (which optionally may be fiber and/or filler reinforced).

It is a further object of the present invention to provide a wholly aromatic polyester which exhibits improved dyeability characteristics and improved bonding characteristics when employed as a melt adhesive.

These and other objects, as well as the scope, nature and utilization of the present invention will be apparent to those skilled in the art from the following detailed description.

SUMMARY OF THE INVENTION

A melt processable wholly aromatic polyester urea capable of forming an anisotropic melt phase at a temperature below approximately 400° C. is provided which consists essentially of the recurring moieties I, II, and III wherein:

I is

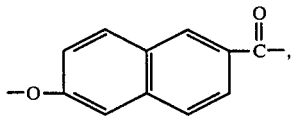

wherein the hydrogen atoms of the aromatic rings optionally may be replaced with substitution selected from the group consisting of an alkyl group of 1 to 4 carbon atoms, an alkoxy group of 1 to 4 carbon atoms, halogen, phenyl, and mixtures of the foregoing, II is

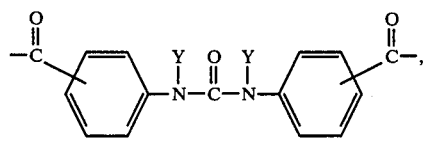

where Y is selected from the group consisting of hydrogen, an alkyl group of 1 to 4 carbon atoms, phenyl, and mixtures of the foregoing, and III is a dioxyaryl moiety of the formula

where Ar is a divalent radical comprising at least one aromatic ring, and wherein the hydrogen atoms of the aromatic rings optionally may be replaced with substitution selected from the group consisting of an alkyl group of 1 to 4 carbon atoms, an alkoxy group of 1 to 4 carbon atoms, halogen, phenyl, and mixtures of the foregoing, and wherein the polyester urea comprises approximately 5 to 90 mole percent of moiety I, approximately 5 to 47.5 mole percent of moiety II, and approximately 5 to 47.5 mole percent of moiety III.

DESCRIPTION OF PREFERRED EMBODIMENTS

The melt processable wholly aromatic polyester urea of the present invention consists essentially of at least three recurring moieties which when combined in the polyester urea have been found to form an atypical highly tractable anisotropic melt phase at a temperature below approximately 400° C., and preferably below approximately 370° C. (e.g. below approximately 350° C. in a particularly preferred embodiment). In those instances when the polyester urea is sufficiently crystalline the polymer melting temperature may be confirmed by the use of a differential scanning calorimeter (i.e. DSC) employing repeat scans at a 20° C. per minute heat-up rate and observing the peak of the DSC melt transition. In those instances when the polyester urea is substantially amorphous it exhibits no melting peak which is readily discernible by differential scanning calorimetry. Because of its ability to exhibit anisotropic properties (i.e. liquid crystalline properties) in the melt, the polyester urea readily can form a product having a highly oriented molecular structure upon melt processing. Preferred polyester ureas are capable of undergoing melt processing at a temperature of approximately 300° to 390° C. The usual difficulties incurred when one attempts to melt process many aromatic polyesters by conventional melt processing techniques effectively are eliminated.

The polyester urea of the present invention is considered to be "wholly aromatic" in the sense that each moiety present contributes at least one aromatic ring to the main chain of the resulting polymer.

The first essential unit (i.e. moiety I) of the polyester urea of the present invention is a 6-oxy-2-naphthoyl moiety of the structural formula:

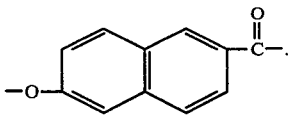

Hydrogen atoms of the aromatic rings optionally may be replaced with substitution such as an alkyl group of 1 to 4 carbon atoms, an alkoxy group of 1 to 4 carbon atoms, halogen, phenyl, and mixtures of these. In a preferred embodiment moiety I is substantially free of aromatic ring substitution.

As will be apparent to those skilled in the art, moiety I can be derived from unsubstituted 6-hydroxy-2-naphthoic acid and the derivatives thereof. A convenient laboratory preparation for forming 6-hydroxy-2-naphthoic acid is described in Berichte, Vol. 58, 2835-45 (1925) by K. Fries and K. Schimmelschmidt which is herein incorporated by reference. U.S. Pat. No. 1,593,816 is concerned with a process for synthesizing 6-hydroxy-2-naphthoic acid by reacting carbon dioxide with the potassium salt of beta-naphthol. See also U.S. Pat. No. 4,287,357.

Moiety I comprises approximately 5 to 90 mole percent of the polyester urea. In a preferred embodiment moiety I is present in a concentration of approximately 20 to 80 mole percent (e.g. 40 to 80 mole percent). In a particularly preferred embodiment moiety I is present in a concentration of approximately 70 mole percent.

The second essential unit (i.e. moiety II) of the polyester urea of the present invention is a dicarboxyaryl urea moiety of the structural formula:

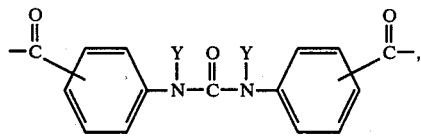

where Y is hydrogen, an alkyl group of 1 to 4 carbon atoms, phenyl, or mixtures of these. In a preferred embodiment Y is methyl. Also in a preferred embodiment the carboxy groups which join the moiety to other moieties in the main polymer chain are para-disposed in relation to the interior urea linkage (i.e. the unit is symmetrical) and the dicarboxyaryl moiety has the structural formula:

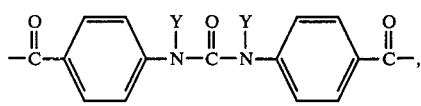

where Y is as previously defined. Accordingly, in a particularly preferred embodiment moiety II is of the structural formula:

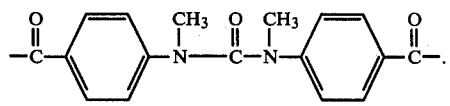

Moiety II can be derived from the corresponding N,N'-bis(carboxyphenyl) urea. For instance, in the particularly preferred embodiment discussed above moiety II can be derived from N,N'-dimethyl-N,N'-bis(p-carboxyphenyl) urea. This compound may be synthesized from 4-methylaminobenzoic acid in the presence of sodium hydroxide and phosgene as described in the Example. Alternatively, moiety II can be formed in situ in the same zone in which polymerization occurs by providing the required reactants in appropriate concentrations. Moiety II can also be synthesized by reaction of p-aminobenzoic acid or its N-alkyl derivatives with diphenyl carbonate. If a sufficiently large excess of diphenyl carbonate is employed, the diphenyl ester of the urea-acid will be generated in situ and this may conveniently be used in a polycondensation reaction utilizing the phenyl ester reaction with free diols, evolving phenol. Such a reaction is a well-known one for forming all aromatic polyesters. In the case of ureas where the nitrogen is not substituted with an alkyl group, i.e. where Y is hydrogen, then the use of p-isocyanatobenzoic acid or its derivatives may be employed. By standard polymer synthesis techniques a series of oligomers of the moieties I and III end-capped with p-isocyanatobenzoic acid can be produced. Reaction of these end-capped oligomers, which could contain a minor proportion of another dicarboxylic acid, with a calculated small amount of water will join two isocyanate ends as a urea link and thus generate in situ the polymer aforementioned. Blocking of the free isocyanate to protect it may be employed where necessary during the synthesis of the oligomeric esters.

Moiety II comprises approximately 5 to 47.5 mole percent of polyester urea. In a preferred embodiment moiety II is present in a concentration of approximately 10 to 40 mole percent (e.g. 10 to 30 mole percent). In a particularly preferred embodiment moiety II is present in a concentration of approximately 15 mole percent.

The third essential moiety (i.e. moiety III) of the polyester urea of the present invention is of the structural formula:

—O—AR—O—, where Ar is a divalent radical comprising at least one aromatic ring. Moiety III preferably is symmetrical in the sense that the divalent bonds which join this moiety to other moieties in the main polymer chain are symmetrically disposed on one or more aromatic rings (e.g. are para to each other or diagonally disposed when present on a naphthalene ring).

Moiety III optionally may include substitution of at least some of the hydrogen atoms present upon an aromatic ring selected from the group consisting of an alkyl group of 1 to 4 carbon atoms, an alkoxy group of 1 to 4 carbon atoms, halogen, phenyl, and mixtures of the foregoing. However, in a preferred embodiment moiety III is substantially free of ring substitution and the concomitant expense associated therewith.

Preferred moieties which may serve as the symmetrical dioxyaryl moiety in the polyester of the present invention include:

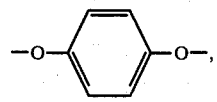

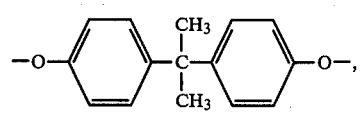

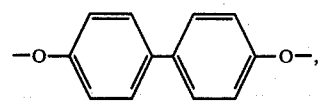

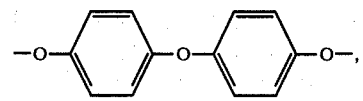

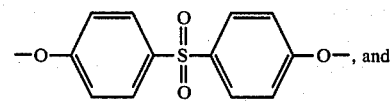

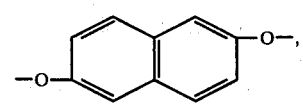

and mixtures of the foregoing.

A particularly preferred symmetrical dioxyaryl moiety is

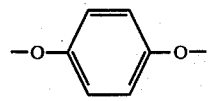

which may be derived from hydroquinone and its derivatives. Examples of ring substituted compounds from which moiety III may be derived include methylhydroquinone, chlorohydroquinone, and bromohydroquinone. An example of a nonsymmetrical dioxyaryl moiety which is suitable for use in the polyester urea of the present invention is resorcinol and its derivatives.

Moiety III comprises approximately 5 to 47.5 mole percent of the polyester urea. In a preferred embodiment moiety III is present in a concentration of approximately 10 to 40 mole percent (e.g. 10 to 30 mole percent). In a particularly preferred embodiment moiety III is present in a concentration of approximately 15 mole percent.

In a preferred embodiment the melt processable wholly aromatic polyester urea of the present invention is capable of forming an anisotropic melt phase at a temperature below approximately 350° C. and consists essentially of the recurring moieties I, II, and III which are free of aromatic ring substitution wherein:

I is 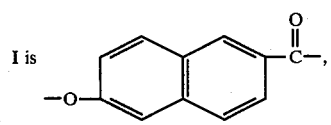

II is

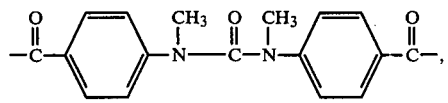

and

III is

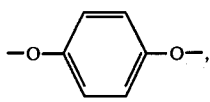

wherein the polyester urea comprises approximately 40 to 80 mole percent (e.g. 70 mole percent) of moiety I, approximately 10 to 30 mole percent (e.g. 15 mole percent) of moiety II, and approximately 10 to 30 mole percent (e.g. 15 mole percent) of moiety III.

Other ester-forming moieties (e.g. dicarboxy units and/or combined oxy and carboxy units) than those specified for moieties I, II, and III additionally may be included in the polyester of the present invention. Representative additional ester-forming moieties may be derived from terephthalic acid, isophthalic acid, p-hydroxybenzoic acid, m-hydroxybenzoic acid, substituted hydroxybenzoic acids, etc. For instance, p-oxybenzoyl units may be incorporated in the wholly aromatic polyester urea of the present invention in a concentration of up to 50 mole percent (e.g. 5 to 50 mole percent). Amide-forming moieties also may be included in the polyester urea of the present invention. Representative reactants which may form such amide-forming moieties include m-aminophenol, p-aminophenol, m-aminobenzoic acid, p-aminobenzoic acid, m-phenylenediamine, p-phenylenediamine, etc. The additional ester-forming moieties and/or amide-forming moieties optionally may be included in the polyester urea of the present invention so long as such moieties do not raise the melting temperature of the resulting polymer above that specified, or do not otherwise interfere with the exhibition of the desired anisotropic properties in the melt.

The polyester urea of the present invention commonly exhibits

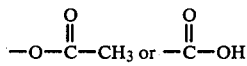

end groups depending upon the synthesis route selected. As will be apparent to those skilled in the art, the end groups optionally may be capped, e.g. acidic end groups may be capped with a variety of alcohols, and hydroxyl end groups may be capped with a variety of organic acids. For instance, end capping units such as phenylester

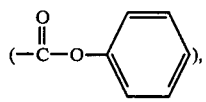

and methylester

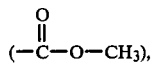

optionally may be included at the end of the polymer chains. The polymer also may be oxidatively cross-linked to at least some degree, if desired, by heating in an oxygen-containing atmosphere (e.g. in air) while in bulk form or as a previously shaped article at a temperature below its melting temperature for a limited period of time (e.g. for a few minutes).

The polyester urea of the present invention tends to be substantially insoluble in all common polyester solvents, such as hexafluoroisopropanol and o-chlorophenol, and accordingly is not susceptible to solution processing. It can be readily processed by common melt processing techniques as discussed hereafter. The polyester urea is soluble in pentafluorophenol to some degree.

The wholly aromatic polyester urea of the present invention commonly exhibits a weight average molecular weight of about 2,000 to 200,000, and preferably about 10,000 to 50,000, e.g., about 20,000 to 25,000. Such molecular weight may be determined by standard techniques not involving the solutioning of the polymer, e.g. by end group determination via infrared spectroscopy on compression molded films. Alternatively, light scattering techniques in a pentafluorophenol solution may be employed to determine the molecular weight.

The polyester urea prior to heat treatment additionally commonly exhibits an inherent viscosity (i.e. I.V.) of at least 0.5, and preferably at least 1.0 (e.g. approximately 0.5 to 8) when dissolved in a concentration of 0.1 percent by weight in pentafluorophenol at 60° C.

The polyester urea of the present invention usually may be considered to be crystalline in the sense that fibers melt extruded therefrom exhibit x-ray diffraction patterns using Ni-filtered CuKα radiation and flat plate cameras characteristic of polymeric crystalline materials. In other embodiments the polyester urea of the present invention is substantially amorphous.

Unlike the aromatic polyesters commonly encountered in much of the prior art, the polyester urea of the present invention is not intractable and forms an anisotropic melt phase whereby an atypical degree of order is manifest in the molten polymer. The subject polyester urea readily forms liquid crystals in the melt phase and accordingly exhibits a high tendency for the polymer chains to orient in the shear direction. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40× with the sample on a Leitz hot stage and under a nitrogen atmosphere. The polymer melt is optically anisotropic, i.e., it transmits light when examined between crossed polarizers. The amount of light transmitted increases when the sample is sheared (i.e. is made to flow); however, the sample is optically anisotropic even in the static state.

The polyester urea of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a largely melt solution of reactants. A vacuum may be applied to facilitate removal of volatiles formed during the final stage of the condensation (e.g., acetic acid or water).

In commonly assigned U.S. Pat. No. 4,067,852 of Gordon W. Calundann, entitled "Melt Processable Thermotropic Wholly Aromatic Polyester Containing Polyoxybenzoyl Units" is described another slurry polymerization process which may be employed to form the polyester urea of the present invention wherein the solid product is suspended in a heat exchange medium. The disclosure of this patent is herein incorporated by reference.

When employing either the melt acidolysis procedure or the slurry procedure of U.S. Pat. No. 4,067,852 the organic monomer reactants from which moieties I and III are derived may be initially provided in a modified form whereby the hydroxyl groups of these monomers are esterified (i.e., they are provided as acyl esters). The lower acyl groups preferably have from about 2 to about 4 carbon atoms. Preferably the acetate esters of the organic compounds which form moieties I and III are provided. Accordingly, particularly preferred reactants for the condensation reaction are are 6-acetoxy-2-naphthoic acid, and hydroquinone diacetate. If p-oxybenzoyl moieties are included in the polyester urea, they preferably are derived from a 4-acetoxybenzoic acid reactant.

Representative catalysts which optionally may be employed in either the melt acidolysis procedure or in the procedure of U.S. Pat. No. 4,067,852 include dialkyl tin oxide (e.g. dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g. $BF_3$), hydrogen halides (e.g. HCl), etc. The quantity of catalyst utilized typically is about 0.001 to 1 percent by weight based upon the total monomer weight, and most commonly about 0.01 to 0.2 percent by weight.

The molecular weight of a previously formed polyester urea may be further increased via a solid state polymerization procedure wherein the particulate polymer is heated in an inert atmosphere (e.g. in a nitrogen atmosphere) at a temperature of about 240° C. for 10 to 12 hours.

The polyester urea of the present invention readily can be melt processed in the substantial absence of polymer degradation to form a variety of relatively stiff shaped articles, e.g., molded three-dimensional articles, fibers, films, tapes, etc. The polyester urea of the present invention is suited for molding applications and may be molded via standard injection molding techniques commonly utilized when forming molded articles. Unlike the polyesters commonly encountered in the prior art it is not essential that more severe injection molding conditions (e.g. higher temperatures), compression molding, impact molding, or plasma spraying techniques be utilized. Fibers or films may be melt extruded.

A molding compound may be formed from the polyester urea of the present invention which incorporates approximately 1 to 60 percent by weight of a solid filler (e.g. talc) and/or reinforcing agent (e.g. glass fibers).

The polyester urea of the present invention also may be employed as a coating material which is applied as a powder or from a liquid dispersion. The polyester urea may also be utilized as a melt adhesive.

When forming fibers and films the extrusion orifice may be selected from among those commonly utilized during the melt extrusion of such shaped articles. For instance, the shaped extrusion orifice may be in the form of a rectangular slit (i.e. a slit die) when forming a polymeric film. When forming a filamentary material, the spinneret selected may contain one and preferably a plurality of extrusion orifices. For instance, a standard conical spinneret containing 1 to 2,000 holes (e.g. 6 to 1,500 holes) such as commonly used in the melt spinning of polyethylene terephthalate, having a diameter of about 1 to 70 mils (e.g. 5 to 40 mils) may be utilized. Yarns of about 20 to 200 continuous filaments are commonly formed. The melt-spinnable polyester urea is supplied to the extrusion orifice at a temperature above its melting point, e.g. a temperature of about 320° to 390° C.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have denier per filament of about 1 to 50, and preferably a denier filament of about 1 to 20.

The resulting filamentary material or film optionally may be subjected to a thermal treatment whereby its physical properties are further enhanced. The tenacity of the fiber or film may be increased by such thermal treatment. More specifically, the fibers or films may be thermally treated in an inert atmosphere (e.g. nitrogen, argon, helium) or in a flowing oxygen-containing atmosphere (e.g. air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 270° C. for 8 hours and at 280° C. for 15 hours. Alternatively, the fiber may be heated at about 15° to 20° C. below the temperature at which it melts for about 24 hours. Optimum heat treatment conditions will vary with the specific composition of the polyester urea and with the fiber's process history.

The fibers formed from the polyester urea of the present invention are fully oriented and exhibit highly satisfactory physical properties which render them suitable for use in high performance applications. The properties are further enhanced by thermal treatment as previously indicated and enable the fibers to be used with particular advantage as tire cords and in other industrial applications, such as conveyor belts, hose, cabling, resin reinforcement, etc. Films formed of the polyester urea of the present invention may be used as strapping tape, cable wrap, magnetic tape, electric motor dielectric film, etc. The fibers and films exhibit an inherent resistance to burning.

The presence of the highly polar urea linkages in the polymer chain is believed to beneficially provide strong electron interactions between adjoining polymer chains and between the polyester urea and other materials, such as rubber matrices, dyes, etc. Such bonds between adjoining polymer chains are believed to manifest enhanced transverse properties in molded articles formed from the polyester urea. Also, the polyester urea, when in fiber form, is believed to possess the ability to better adhere to a rubber matrix in view of the presence of the highly polar urea linkages along the polymer chain which are provided by moiety II.

The following example is presented as a specific illustration of the claimed invention. It should be understood, however, that the invention is not limited to the specific details set forth in the example.

EXAMPLE

To a 300 ml. three-neck flask equipped with a sealed paddle stirrer, inert gas inlet tube, and a distillation head connected to a condenser were added the following:
(a) 40.3 grams of 6-acetoxy-2-naphthoic acid (0.175 mole);
(b) 12.3 grams of N,N'-dimethyl-N,N'-bis(p-carboxyphenyl)urea (0.0375 mole);
(c) 7.4 grams of hydroquinone diacetate (0.038 mole); and
(d) 0.01 gram of sodium acetate catalyst.

The flask was thoroughly purged of oxygen by evacuation and refilling with argon three times, and was initially heated to 250° C. under a slow stream of argon. The contents of the flask were melted to form a clear amber liquid and began to vigorously evolve acetic acid as the condensation reaction commenced. When approximately 2.5 ml. of acetic acid has been collected, the contents of the flask changed to an opaque tan color. After the flask has been heated at 250° C. for 30 minutes, 7.5 ml. of acetic acid were collected which represented 50 percent of the theoretical amount. The temperature of the flask was next raised to 280° C. After the flask had been heated at 280° C. for 30 minutes, 10.7 ml. of acetic acid were collected which represented 75 percent of the theoretical amount. The temperature of the flask was next raised to 300° C. After the flask had been heated at 300° C. for 30 minutes, 11.8 ml. of acetic acid were collected which represented 82 percent of the theoretical amount. The temperature of the flask was next raised to 320° C. After the flask had been heated at 320° C. for 30 minutes, 12.1 ml. of acetic acid had been collected which represented 85 percent of the theoretical amount.

The pressure on the flask next gradually was reduced to 0.5 mm. so as not to cause excessive bubbling. While stirring continued, the contents of the flask were heated at 320° C. for 60 minutes. It was then observed that a pearly tan-colored polymer melt was present in the flask which appeared to be more viscous than the melt previously observed in the flask. The contents of the flask were next heated to 330° C. and held at 330° C. for 20 minutes, and finally were heated to 340° C. and held at 340° C. for 20 minutes. The viscosity of the polymer melt was observed to have further increased at this stage of the condensation reaction. The vacuum next was released with argon and the resulting polyester urea was allowed to cool in the absence of air prior to being removed from the flask.

The inherent viscosity (I.V.) of the polyester urea was 0.6 as determined in a pentafluorophenol solution of 0.1 percent by weight concentration at 60° C. in accordance with the equation:

$$I.V. = \frac{\ln(\eta\ rel)}{c}$$

where c = concentration of solution (0.1 percent by weight), and $\eta$ rel = relative viscosity. When the polymer was subjected to differential scanning calorimetry (20° C./min. heating rate), it exhibited a second order glass transition temperature at 120° C. and a weak melt endotherm at 300° C. The polymer melt was optically anisotropic.

The resulting molten polyester urea while at a temperature of 320° C. is capable of being melt extruded to form strong high performance filaments.

The N,N'-dimethyl-N,N'-bis(p-carboxyphenyl) urea reactant employed in the formation of the polyester urea (as described above) was synthesized from 4-methylaminobenzoic acid in the presence of phosgene and sodium hydroxide. More specifically, 50 grams of 4-methylaminobenzoic acid (0.33 mole) was in a solution of 26.4 grams of sodium hydroxide in 250 ml. of water in a four-neck one liter flask fitted with a paddle stirrer, tap funnel, thermometer, and a solid carbon dioxide condenser. With stirring 131 ml. of a 12.5 weight/volume solution of phosgene in toluene was added slowly while keeping the contents of the flask below 30° C. After one hour the reaction was complete, the toluene layer was removed, and the aqueous layer was acidified to yield the N,N'-dimethyl-N,N'-bis(p-carboxyphenyl) urea in impure form. This impure product was a cream-colored powder which possessed a dry weight of 36 grams. Mass spectrometry showed the product to be a mixture of unreacted methylaminobenzoic acid and the desired N,N'-dimethyl-N,N'-bis(p-carboxyphenyl) urea. The crude mixture was next stirred at 35° C. with 350 ml. of 20 percent hydrochloric acid. After one-half hour, the mixture was filtered, and the solid product was washed with distilled water and dried in air at 70° C. overnight. The residue weighed 19.6 grams and melted at 291° to 292° C. with decomposition. Further recrystallization from 3A alcohol yielded a pale cream powder which melted at 291° to 292° C. with decomposition and whose infrared spectrum showed no trace of any N-H peak due to unreacted p-methylaminobenzoic acid, and confirmed the identity of the desired product. The NMR spectrum was likewise compatible with this conclusion. The final N,N'-dimethyl-N,N'-bis(p-carboxyphenyl) urea product was recovered in a theoretical yield of 26 percent and weighed 14 grams.

Although the invention has been described with a preferred embodiment it is to be understood that variations and modifications may be employed without departing from the concept of the invention as defined in the following claims.

I claim:

1. A melt processable wholly aromatic polyester urea capable of forming an anisotropic melt phase at a temperature below approximately 400° C. consisting essentially of the recurring moieties I, II, and III wherein:
   I is

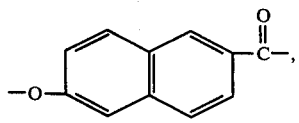

wherein the hydrogen atoms of the aromatic rings optionally may be replaced with substitution selected from the group consisting of an alkyl group of 1 to 4 carbon atoms, an alkoxy group of 1 to 4 carbon atoms, halogen, phenyl, and mixtures of the foregoing, II is

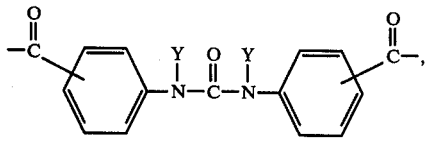

where Y is selected from the group consisting of hydrogen, an alkyl group of 1 to 4 carbon atoms, phenyl, and mixtures of the foregoing, and III is a dioxyaryl moiety of the formula

where Ar is a divalent radical comprising at least one aromatic ring, and wherein the hydrogen atoms of the aromatic rings optionally may be replaced with substitution selected from the group consisting of an alkyl group of 1 to 4 carbon atoms, an alkoxy group of 1 to 4 carbon atoms, halogen, phenyl, and mixtures of the foregoing, and wherein said polyester urea comprises approximately 5 to 90 mole percent of moiety I, approximately 5 to 47.5 mole percent of moiety II, and approximately 5 to 47.5 mole percent of moiety III.

2. A melt processable wholly aromatic polyester urea according to claim 1 which is capable of forming an anisotropic melt phase at a temperature below approximately 370° C.

3. A melt processable wholly aromatic polyester urea according to claim 1 which is capable of undergoing melt processing at a temperature in the range of approximately 300° to 390° C.

4. A melt processable wholly aromatic polyester urea according to claim 1 which exhibits an inherent viscosity of at least 0.5 when dissolved in a concentration of 0.1 percent by weight in pentafluorophenol at 60° C.

5. A melt processable wholly aromatic polyester urea according to claim 1 which exhibits an inherent viscosity of at least 1.0 when dissolved in a concentration of 0.1 percent by weight in pentafluorophenol at 60° C.

6. A melt processable wholly aromatic polyester urea according to claim 1 wherein the aromatic rings of moieties I and III are substantially free of ring substitution.

7. A melt processable wholly aromatic polyester urea according to claim 1 wherein moiety II is

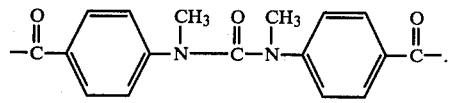

8. A melt processable wholly aromatic polyester urea according to claim 1 wherein moiety III is symmetrically disposed.

9. A melt processable wholly aromatic polyester urea according to claim 1 wherein the dioxyaryl moiety III is

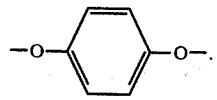

10. A melt processable wholly aromatic polyester urea according to claim 1 which additionally includes up to 50 mole percent of p-oxybenzoyl moiety.

11. A fiber which has been melt spun from the melt processable wholly aromatic polyester urea of claim 1.

12. A film which has been melt extruded from the melt processable wholly aromatic polyester urea of claim 1.

13. A molded article comprising the melt processable wholly aromatic polyester urea of claim 1.

14. A molding compound comprising the melt processable wholly aromatic polyester urea of claim 1 which incorporates approximately 1 to 60 percent by weight of a solid filler and/or reinforcing agent.

15. A melt processable wholly aromatic polyester urea capable of forming an anisotropic melt phase at a temperature below approximately 400° C. consisting essentially of the recurring moieties I, II, and III wherein:

I is

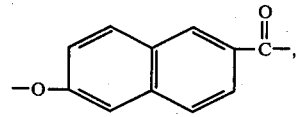

wherein the hydrogen atoms of the aromatic rings optionally may be replaced with substitution selected from the group consisting of an alkyl group of 1 to 4 carbon atoms, an alkoxy group of 1 to 4 carbon atoms, halogen, phenyl, and mixtures of the foregoing, II is

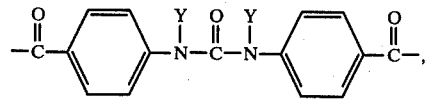

where Y is selected from the group consisting of hydrogen, an alkyl group of 1 to 4 carbon atoms, phenyl, and mixtures of the foregoing, and III is a symmetrical dioxyaryl moiety of the formula

where Ar is a divalent radical comprising at least one aromatic ring, and wherein the hydrogen atoms of the aromatic rings optionally may be replaced with substitution selected from the group consisting of an alkyl group of 1 to 4 carbon atoms, an alkoxy group of 1 to 4 carbon atoms, halogen, phenyl, and mixtures of the foregoing, and wherein said polyester urea comprises approximately 20 to 80 mole percent of moiety I, approximately 10 to 40 mole percent of moiety II, and approximately 10 to 40 mole percent of moiety III.

16. A melt processable wholly aromatic polyester urea according to claim 15 which is capable of forming an anisotropic melt phase at a temperature below approximately 370° C.

17. A melt processable wholly aromatic polyester urea according to claim 15 which is capable of undergoing melt processing at a temperature in the range of approximately 320° to 390° C.

18. A melt processable wholly aromatic polyester urea according to claim 15 which exhibits an inherent viscosity of at least 0.5 when dissolved in a concentration of 0.1 percent by weight in pentafluorophenol at 60° C.

19. A melt processable wholly aromatic polyester urea according to claim 15 which exhibits an inherent viscosity of at least 1.0 when dissolved in a concentration of 0.1 percent by weight in pentafluorophenol at 60° C.

20. A melt processable wholly aromatic polyester urea according to claim 15 wherein the aromatic rings of moieties I and III are substantially free of ring substitution.

21. A melt processable wholly aromatic polyester urea according to claim 15 wherein moiety II is

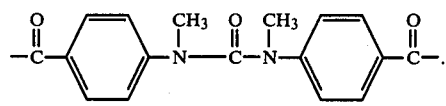

22. A melt processable wholly aromatic polyester urea according to claim 15 wherein the symmetrical dioxyaryl moiety III is selected from the group consisting of

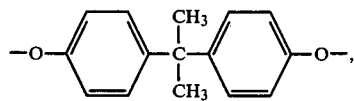

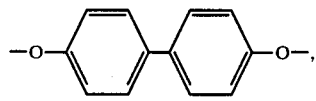

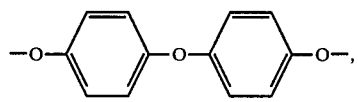

-continued

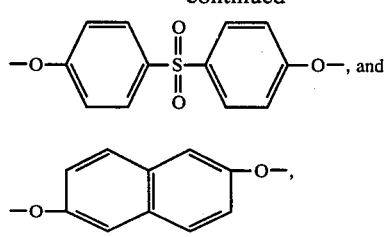

and mixtures of the foregoing.

23. A melt processable wholly aromatic polyester urea according to claim 15 wherein the symmetrical dioxyaryl moiety III is

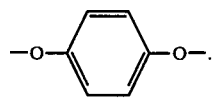

24. A melt processable wholly aromatic polyester urea according to claim 15 wherein moiety I is present in a concentration of approximately 40 to 80 mole percent, moiety II is present in a concentration of approximately 10 to 30 mole percent, and moiety III is present in a concentration of approximately 10 to 30 mole percent.

25. A melt processable wholly aromatic polyester urea capable of forming an anisotropic melt phase at a temperature below approximately 350° C. consisting essentially of the recurring moieties I, II, and III which are free of aromatic ring substitution wherein:

I is

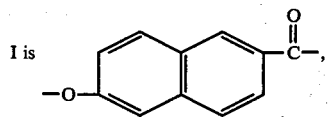

II is

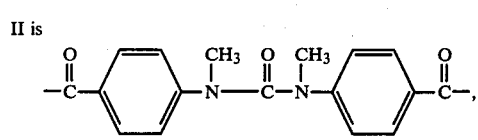

and

III is

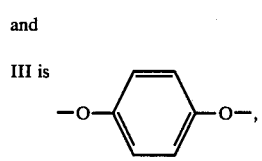

wherein said polyester urea comprises approximately 40 to 80 mole percent of moiety I, approximately 10 to 30 mole percent of moiety II, and approximately 10 to 30 mole percent of moiety III.

26. A melt processable wholly aromatic polyester urea according to claim 25 wherein moiety I is present in a concentration of approximately 70 mole percent, moiety II is present in a concentration of approximately 15 mole percent, and moiety III is present in a concentration of approximately 15 mole percent.

* * * * *